(12) United States Patent
Köhler et al.

(10) Patent No.: US 6,534,606 B2
(45) Date of Patent: Mar. 18, 2003

(54) CATALYST SYSTEM FOR THE ZIEGLER-NATTA POLYMERIZATION OF OLEFINS

(75) Inventors: Katrin Köhler, Dossenheim (DE); Eike Poetsch, Mühltal (DE); Herbert Schumann, Berlin (DE); Sebastian Dechert, Berlin (DE); Walter Kaminsky, Pinneberg (DE); Andre Laban, Hamburg (DE); Manfred Arnold, Leissling (DE); Jana Knorr, Dessau (DE); Birgit Corinna Wassermann, Berlin (DE)

(73) Assignee: Merck Patent Gesellschaft Mit Beschränkter Haftung, Darmstadt (DE)

( * ) Notice: Subject to any disclaimer, the term of this patent is extended or adjusted under 35 U.S.C. 154(b) by 56 days.

(21) Appl. No.: 09/801,045

(22) Filed: Mar. 8, 2001

(65) Prior Publication Data

US 2002/0173603 A1 Nov. 21, 2002

(30) Foreign Application Priority Data

Mar. 8, 2000 (DE) .......................... 100 10 796

(51) Int. Cl.$^7$ .................................. C08F 4/42
(52) U.S. Cl. .................... 526/151; 526/348; 526/124.3; 526/128; 526/142; 526/125.3; 502/132; 502/103; 502/118; 502/125; 502/127; 556/9; 556/27; 556/51
(58) Field of Search ................. 526/151, 348, 526/124.3, 128, 142, 125.3; 502/132, 103, 118, 125, 127; 556/9, 27, 51

(56) References Cited

U.S. PATENT DOCUMENTS 5,468,707 A  * 11/1995  Pohl et al. ................... 502/153

FOREIGN PATENT DOCUMENTS

| JP | 62-138506 | * 6/1987 |
| JP | 11-269180 | * 10/1999 |

OTHER PUBLICATIONS

Soga et al., Prog. Polym. Sci., vol. 22, 1503–1546, 1997.*

* cited by examiner

*Primary Examiner*—David W. Wu
*Assistant Examiner*—Ling-Siu Choi
(74) *Attorney, Agent, or Firm*—Millen, White, Zelano & Branigan, P.C.

(57) ABSTRACT

Described are catalyst systems having aluminium alkyl complexes of the formula (I) described herein applied to magnesium chloride, $SiO_2$ or $SiO_2$ in combination with $MgCl_2$ as support in the presence of titanium halides or vanadium halides and internal and, if desired, external donors act both as cocatalysts and as stereoselectivity promoters in heterogeneous polymerizations of α-olefins. Also described are polymerization methods using these catalyst systems.

9 Claims, No Drawings

CATALYST SYSTEM FOR THE ZIEGLER-NATTA POLYMERIZATION OF OLEFINS

The invention relates to novel catalyst systems characterized in that aluminium alkyl complexes of the formula (I), such as described in DE 19753135 applied to magnesium chloride, $SiO_2$ or $SiO_2$ in combination with $MgCl_2$ as support in the presence of titanium halides or vanadium halides act both as cocatalysts and as stereo-selectivity promoters in heterogeneous polymerizations of α-olefins,

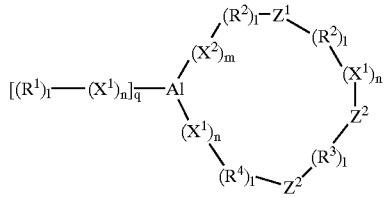

(I)

where $X^1$ is NH, $NH_2$*, NH—A*, NH—$SiA_3$*, N—A, $NSiA_3$, $N(A)_2$*, $N(SiA_3)_2$*, O, $OSiA_2$, OA*, $OSiA_3$*, OAryl*, S, $SSiA_2$, SA*, $SSiA_3$*, PA, $PSiA_3$, $P(A)_2$*, $P(SiA_3)_2$* or a single bond, $X^2$ is NH, N—A, $NSiA_3$, O, $OSiA_2$, S, $SSiA_2$, PA or $X^1$ coordinated to $Al(R^1)_3$, or a single bond, $R^1$ is H; Hal when n=0; A, if desired covalently bound to Al; $Si(A)_3$ when $X^1$=O, $R^2$ is A, if desired covalently bound to Al; $CH_2$—CH=CH, $CH_2$—C≡C when $Z^1$=H;

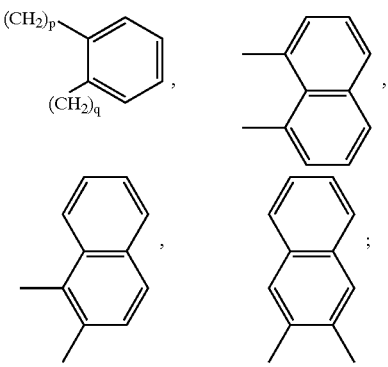

$R^3$ and $R^4$ are each, independently of one another, a bond or $R^2$ or $Si(A)_3$ or $Si(A)_2$, $Z^1$ is a bond or H bound to $R^2$, $Z^2$ is a bond or H bound to $R^2$ and $R^3$, where A is branched or unbranched $C_1$–$C_7$-alkyl, -alkylidene or -alkenylidene, Aryl is phenyl, naphthyl, indenyl, fluorenyl, Hal is F, Cl, and, independently of one another, n is 0 or 1, m is 0 or 1, p is 0 or 1, q is 1 or 2, l is 0 or 1, where coordinate bonds can exist between $X^1$, $X^2$ and Al, and $R^1$, $R^2$, $R^3$, $R^4$, $X^1$, $X^2$, $Z^1$ and $Z^2$ can, in each case independently of one another at different positions in the molecule, assume all meanings and $X^1$ can assume only the meanings denoted by "*" when l=0 and $R^1$, $R^2$, $R^3$ or $R^4$ are not present.

Ziegler-Natta-catalysed polymerization is a polymerization method which has been improved over a number of generations since the initial work by Ziegler and Natta in the 1950s. Seeking to increase both the activity and the stereo-selectivity has been the driving force for the continuous development of the catalyst system. The system established at the present time is based on the use of a multicomponent catalyst. In addition to the support material, this comprises as actual catalyst a transition metal compound, e.g. a titanium compound, which is activated only by addition of an aluminium-containing cocatalyst. In addition, further constituents such as internal and external donors are necessary. The use of an internal donor prevents agglomeration of the catalytically active species, while the external donor improves the stereospecificity when using prochiral olefins. Thus, in a polymerization using liquid propene, the system $MgCl_2$/ester/$TiCl_4$/$AlEt_3$/$PhSi(OEt)_3$ makes it possible to achieve a productivity of 600 [$kg_{PP}/g_{Ti}$] combined with an isotacticity of 98%. These catalyst systems save the costly removal of catalyst residues and the complicated extraction of atactic material from the polyolefins produced. The understanding which has now been gained regarding the relationship between catalyst and polymer morphology makes it possible to control the polymer morphology during the polymerization process, which eliminates additional processing steps such as extrusion and granulation. These advances have for the first time made it possible to carry out solvent-free gas-phase polymerization and bulk polymerization and have led to substantial simplifications in the case of suspension polymerization. [P. Galli, J. C. Haylock, *Makromol. Chem., Macromol. Symp.* 1992, 63, 19–54; P. Corradini, V. Buscio, G. Guerra, in *Comprehensive Polymer Science*, Vol. 4, G. Allen (Ed.), Pergamon Press, 1999, p. 29; C. Jenny, P. Maddox, *Solid State & Mat. Science* 1988, 3, 94; K. Soga, T. Shiono, *Progress in Polymer Science* 1997, 22, 1503].

DE 19753135 describes a series of aluminium compounds which have an intramolecular donor side chain, e.g. an amino-, thio- or oxo-coordinated side chain, and can be prepared by methods known to those skilled in the art for preparing organometallic compounds. These aluminium compounds act as cocatalytically activating components in Ziegler-Natta catalysts for the polymerization of ethylene. However, the polymerization of propylene or higher α-olefins cannot be carried out successfully using the catalyst systems described in this patent application. Furthermore, the catalyst systems used there did not include a catalyst support, which makes them difficult or impossible to use in industrial plants and additionally does not allow the desired polymer morphology to be set.

Apart from the continual striving for more active and more selective catalyst systems, the following aspects are in need of improvement:

a) The catalyst systems used in industry comprise highly pyrophoric, reactive, volatile aluminium alkyl compounds as cocatalysts, in particular triethylaluminium. These compounds are highly sensitive to impurities in the reaction medium, for example to residual moisture in the monomers to be polymerized. In addition, the safe handling of such highly pyrophoric and volatile compounds requires expensive safety containers for storage and transport under absolute exclusion of oxygen and moisture. Furthermore, the industrial plants for catalyst preparation and polymerization have to be able to cope with these problems. This is, in particular, a problem for industrially relatively undeveloped countries and regions in which high temperatures and high atmospheric humidity prevail as a result of the climate.

b) To be able to achieve further increases in the yield of polymers in olefin polymerization, catalyst systems having higher activities have to be tailored and developed. The activity increase should be able to be achieved by optimization of the cocatalyst, since it converts the catalyst into the actual catalytically active species.

c) To achieve high stereoselectivities in the Ziegler-Natta catalysis of prochiral olefins, additional costly external donors such as $PhSi(OEt)_3$ have to be used. The properties (tacticity and molecular weight distribution) of the polymers obtained using external donors have hitherto not been able to be optimized fully satisfactorily, so that there is a continuing need for polymers having improved properties.

d) Since the cocatalyst in Ziegler-Natta catalysts is usually used in a large excess relative to the catalyst and is thus the most costly component, there is great interest in reducing the cocatalyst/catalyst ratio while retaining the activities.

It is therefore an object of the present invention to provide catalyst systems which do not have the disadvantages listed under a), b), c) and d) and can be used both for the polymerization of ethylene and of propylene and higher α-olefins. Another object of the present invention is to provide corresponding catalyst systems which are bound to suitable supports, simply and inexpensively. The catalyst systems of the present invention should be usable in industrial plants under simple conditions with a relatively small cocatalyst/catalyst ratio and should at the same time have activities which are better than those of previously known systems. Another object of the present invention is to provide corresponding catalyst systems which are less sensitive to impurities, in particular moisture.

Upon further study of the specification and appended claims, further objects and advantages of this invention will become apparent to those skilled in the art.

The invention includes catalyst systems comprising a) aluminium alkyl complexes of the formula (I)

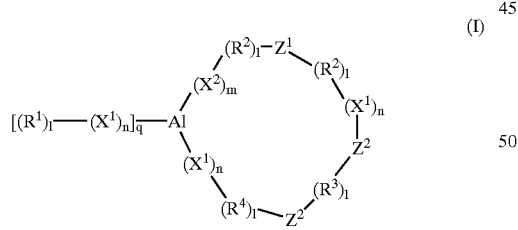

where $X^1$ is NH, $NH_2$*, NH—A*, NH—$SiA_3$*, N—A, $NSiA_3$, $N(A)_2$*, $N(SiA_3)_2$*, O, $OSiA_2$, OA*, $OSiA_3$*, OAryl*, S, $SSiA_2$, SA*, $SSiA_3$*, PA, $PSiA_3$, $P(A)_2$*, $P(SiA_3)_2$* or a single bond, $X^2$ is NH, N—A, $NSiA_3$, O, $OSiA_2$, S, $SSiA_2$, PA or $X^1$ coordinated to $Al(R^1)_3$, or a single bond, $R^1$ is H; Hal when n=0; A, if desired covalently bound to Al; $Si(A)_3$ when $X^1$=O, $R^2$ is A, if desired covalently bound to Al;

$CH_2$—CH=CH, $CH_2$—C≡C when $Z^1$=H;

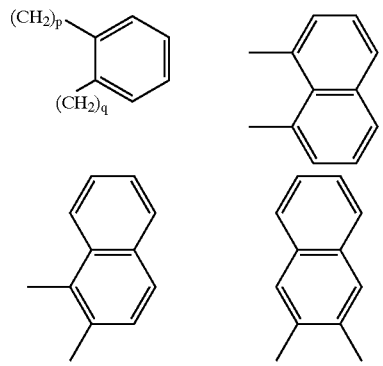

$R^3$ and $R^4$ are each, independently of one another, a bond or $R^2$ or Si $(A)_3$ or $Si(A)_2$, $Z^1$ is a bond or H bound to $R^2$, $Z^2$ is a bond or H bound to $R^2$ and $R^3$, where A is branched or unbranched $C_1$–$C_7$-alkyl, -alkylidene or -alkenylidene, Aryl is phenyl, naphthyl, indenyl, fluorenyl, Hal is F, Cl, and, independently of one another, n is 0 or 1, m is 0 or 1, p is 0 or 1, q is 1 or 2, l is 0 or 1, where coordinate bonds can exist between $X^1$, $x^2$ and Al, and $R^1$, $R^2$, $R^3$, $R^4$, $X^1$, $X^2$, $Z^1$ and $Z^2$ can, in each case independently of one another at different positions in the molecule, assume all meanings and $X^1$ can assume only the meanings denoted by "*" when l=0 and $R^1$, $R^2$, $R^3$ or $R^4$ are not present, b) magnesium chloride, $SiO_2$ or $SiO_2$ in combination with $MgCl_2$ as support material, c) a catalyst selected from the group consisting of titanium halides and vanadium halides and d) internal donors such as mono esters or diesters, e.g. ethyl benzoate, dimethyl phthalate, or internal donors with which those skilled in the art are familiar and, if desired, also external donors selected from the group consisting of compounds $RSi(OR)_3$, e.g. $PhSi(OEt)_3$, or external donors with which those skilled in the art are familiar.

In particular embodiments the invention is achieved by corresponding catalyst systems comprising at least one aluminium alkyl complex of the formula (I) selected from the group consisting of

[3-(dimethylamino)propyl]dimethylaluminium,
[3-(dimethylamino)propyl]methylaluminium chloride,
[3-(diethylamino)propyl]diethylaluminium,
[3-(diethylamino)propyl]dipropylaluminium,
[3-(diethylamino)propyl]dibutylaluminium,
[4-(diethylamino)butyl]dibutylaluminium,
[3-(dimethylamino)propyl]aluminium dichloride,
[2-(dimethylamino)benzyl]diethylaluminium,
[3-(dimethylamino)benzyl]ethylaluminium chloride,
[2,6-bis(dimethylaminomethyl)phenyl]diethylaluminium,
[8-(dimethylamino)naphthyl]dimethylaluminium,
[8-(dimethylamino)naphthyl]diethylaluminium,
1-[3-(dimethylamino)propyl]-1-aluminacyclohexane, 1-[3-(dimethylamino)-2-methylpropyl]-1-aluminacyclohexane,
1-[3-(dimethylamino)propyl]-1-aluminacycloheptane,
bis[3-(dimethylamino)propyl]methylaluminium,
1,5-dimethyl-1-alumina-5-azacyclooctane,
1-ethyl-5-methyl-1-alumina-5-azacyclooctane,
1-alumina-5-azabicyclo[3.3.3]undecane,
[4-(methoxy)butyl]dimethylaluminium,
[3-(ethoxy)propyl]diethylaluminium,
[3-(ethoxy)propyl]dibutylaluminium,
[3-(propoxy)propyl]dibutylaluminium,
[4-(ethoxy)butyl]dibutylaluminium,
[5-(ethoxy)pentyl]dibutylaluminium,
[3-(ethylthiopropyl)diethylaluminium,
[3-(ethylthiopropyl)dibutylaluminium,
bis{[2-(dimethylamino)ethoxy]dimethylaluminium}
bis{[2-(dimethylamino)ethoxy]diethylaluminium}
bis{[2-(diethylamino)ethoxy]diethylaluminium}
bis{[3-(diethylamino)propoxy]diethylaluminium}
bis{[2-(dimethylamino)ethoxy]dibutylaluminium}
bis{[2-(methoxy)ethoxy]dimethylaluminium}
bis{[3-(methoxy)propoxy]dimethylaluminium}
bis{[2-(methoxy)ethoxy]diethylaluminium}
bis{[2-(methoxy)ethoxy]dibutylaluminium}
bis{[2-(butoxy)ethoxy]dimethylaluminium}
bis{[2-(butoxy)ethoxy]dibutylaluminium}
bis{[2-(ethoxy)ethoxy]diethylaluminium}
bis{[2-(phenoxy)ethoxy]dimethylaluminium}
bis{[2-(methoxy)phenoxy]dimethylaluminium}
[2-(diethylamino)ethoxy]diethylaluminium.AlEt$_3$ adduct,
[3-(diethylamino)propoxy]diethylaluminium.AlEt$_3$ adduct,
[2-(methoxy)ethoxy]dimethylaluminium.AlMe$_3$ adduct,
[2-(methoxy)ethoxy]diethylaluminium.AlEt$_3$ adduct,
[2-(ethoxy)ethoxy]diethylaluminium.AlEt$_3$ adduct,
[3-(ethoxy)propoxy]diethylaluminium.AlEt$_3$ adduct,
[2-(methylthio)ethoxy]dimethylaluminium.AlMe$_3$ adduct.

The present invention therefore also provides for the use of such a catalyst system in heterogeneous polymerizations of α-olefins and prochiral olefins, in particular of ethylene and propylene.

In these reactions, the catalyst system of the invention can be used as a stereoselectivity promoter. The polymer properties can be controlled by selectively choosing the catalyst.

The present invention further provides a process for preparing catalyst systems according to the invention for the polymerization of α-olefins or prochiral olefins. Depending on the application, the preparation can be carried out by (a) applying a titanium or vanadium halide to MgCl$_2$ or SiO$_2$ or to a combination of SiO$_2$ and MgCl$_2$ as support and adding an internal donor such as monoesters or diesters, e.g. ethyl benzoate, dimethyl phthalate, or internal donors with which those skilled in the art are familiar and, if desired, also external donors selected from the group consisting of compounds RSi(OR)$_3$, e.g. PhSi(OEt)$_3$ or external donors with which those skilled in the art are familiar and an aluminium compound of the formula (I). or by (b) applying an aluminium compound of the formula (I) to MgCl$_2$, SiO$_2$ or SiO$_2$ in combination with MgCl$_2$ as support and adding a titanium or vanadium halide and adding an internal donor such as monoesters or diesters, e.g. ethyl benzoate, dimethyl phthalate, or internal donors with which those skilled in the art are familiar and, if desired, also external donors selected from the group consisting of compounds RSi(OR)$_3$, e.g. PhSi(OEt)$_3$, or external donors with which those skilled in the art are familiar, or by (c) applying an active species generated from an aluminium compound of the formula (I) and a titanium or vanadium halide to MgCl$_2$ or SiO$_2$ or to a combination of SiO$_2$ and MgCl$_2$ as support and adding an internal donor such as monoesters or, diesters, e.g. ethyl benzoate, dimethyl phthalate, or internal donors with which those skilled in the art are familiar and, if desired, also external donors selected from the group consisting of compounds RSi(OR)$_3$, e.g. PhSi(OEt)$_3$, or external donors with which those skilled in the art are familiar.

It has surprisingly been found that application of the aluminium compounds of the formula (I) to magnesium chloride or SiO$_2$ or to a combination of SiO$_2$ and MgCl$_2$ as support in the presence of titanium or vanadium halides and internal donors such as monoesters or diesters, e.g. ethyl benzoate, dimethyl phthalate, or internal donors with which those skilled in the art are familiar and, if desired, also external donors selected from the group consisting of compounds RSi(OR)$_3$, e.g. PhSi(OEt)$_3$, or external donors with which those skilled in the art are familiar gives a catalyst system which, firstly makes possible the polymerization of α-olefins, in particular propylene, in high yields and, secondly, leads to a tremendous increase in activity in the polymerization of ethylene even at 30° C. compared with the unsupported catalyst systems. Various methods of application to the support have been developed:

(a) application of a titanium or vanadium halide to MgCl$_2$ or SiO$_2$ or to a combination of SiO$_2$ and MgCl$_2$ as support and addition of an internal donor such as monoesters or diesters, e.g. ethyl benzoate, dimethyl phthalate, or internal donors with which those skilled in the art are familiar and, if desired, also external donors selected from the group consisting of compounds RSi(OR)$_3$, e.g. PhSi(OEt)$_3$ or external donors with which those skilled in the art are familiar and addition of an aluminium compound of the formula (I)

(b) addition of an aluminium compound of the formula (I) to MgCl$_2$ or SiO$_2$ or to a combination of SiO$_2$ and MgCl$_2$ as support and addition of a titanium or vanadium halide and addition of an internal donor such as monoesters or diesters, e.g. ethyl benzoate, dimethyl phthalate, or internal donors with which those skilled in the art are familiar and, if desired, also external donors selected from the group consisting of compounds RSi(OR)$_3$, e.g. PhSi(OEt)$_3$, or external donors with which those skilled in the art are familiar, (c) addition of an active species previously generated from the two components to MgCl$_2$ or SiO$_2$ or to a combination of SiO$_2$ and MgCl$_2$ as support and adding an internal donor such as monoesters or diesters, e.g. ethyl benzoate, dimethyl phthalate, or internal donors with which those skilled in the art are familiar and, if desired, also external donors selected from the group consisting of compounds RSi(OR)$_3$, e.g. PhSi(OEt)$_3$, or external donors with which those skilled in the art are familiar.

The experiments carried out indicated that the method (A) gives the highest activities during olefin polymerization. The use of selected donor-stabilized organoaluminium compounds also gives higher activities than those achieved in the prior art.

It has been found that the polymer properties can be controlled by choice of the cocatalyst.

The catalyst systems of the invention can advantageously be used under conditions which assist the process. The latter is particularly the case when using a cocatalyst/catalyst ratio lower than that hitherto customary. In particular, the polymerization properties can be controlled according to the invention by altering this ratio.

A further advantageous property which has been found is that the novel catalyst systems are quite stable to air, moisture and impurities in the reaction system and thus require technically less demanding containers for storage and transport or technically less complicated plants for the preparation of the catalyst and for the polymerization of olefins. The novel catalyst systems also have a high thermal stability and long life under reaction conditions.

Furthermore, it has surprisingly been found that the novel catalyst systems consisting of $MgCl_2$ or $SiO_2$ or a combination of $SiO_2$ and $MgCl_2$, a titanium or vanadium halide compound, an internal donor and an aluminium compound of the formula (I) are also stereoselective in the polymerization of prochiral olefins without addition of external donors.

The aluminium compounds of the formula (I) can therefore simultaneously perform a plurality of functions in the novel catalyst systems: they act firstly as cocatalysts and secondly as stereo-selectivity promoters. This makes it possible to reduce the number of catalyst components necessary by one component. The third function is to control the molecular structure of the polymers, e.g. molecular weights, molecular weight distributions, tacticities and branching, and thus the polymer properties such as hardness, stiffness, toughness, weldability, transparency, gas permeability and processability.

A reduction in the number of catalyst components also, in addition to the higher thermal stability and lower oxygen and moisture sensitivity found, makes the processes for catalyst preparation and olefin polymerization generally easier.

The low oxygen and moisture sensitivity of the aluminium compounds of the formula (I), which makes more convenient and safe handling possible, is achieved by means of the intramolecularly stabilizing donor group with coordinative saturation of the aluminium centre.

As described, the novel catalyst systems consist of support, catalyst, donor and cocatalyst:

Cocatalysts employed are the aluminium compounds of the formula (I).

Catalysts employed are compounds of transition metals of transition groups IV to VIII of the Periodic Table of the Elements, in particular compounds of transition metals of transition groups IV and V of the Periodic Table, in particular titanium and vanadium halide compounds. Examples of suitable compounds are $TiCl_4$ and $VCl_4$.

As catalyst support, it is possible to use anhydrous $MgCl_2$ or $SiO_2$ or a combination of $SiO_2$ and $MgCl_2$.

Donors used are internal donors such as monoesters or diesters, e.g. ethyl benzoate, dimethyl phthalate, or internal donors with which those skilled in the art are familiar and, if desired, also external donors selected from the group consisting of compounds $RSi(OR)_3$, e.g. $PhSi(OEt)_3$, or external donors with which those skilled in the art are familiar.

The preparation of the novel supported catalyst systems is carried out by a process which is disclosed with the aid of examples given in the following text. These examples are specific embodiments; a person skilled in the art will, on the basis of his technical knowledge, be able to replace means indicated therein by corresponding means having an equivalent action.

To prepare the supported catalyst systems, it is possible to use aprotic, nonpolar solvents such as pentane, hexane, heptane, octane, benzene or toluene as solvents.

It has been found that preferred active systems are obtained when the cocatalyst/catalyst ratio is in the range from 1:1 to 80:1, more preferably from 5:1 to 20:1.

It has been found that the cocatalyst/catalyst ratio can be reduced in the novel catalyst systems without decreases in activity resulting. In addition, the use of the novel cocatalysts in the polymerization of ethylene and propylene leads to an increase in activity in comparison with conventional catalyst systems. In this way, the catalyst systems of the invention can be prepared considerably more cheaply than corresponding, previously known systems. The cocatalyst/catalyst ratio can be reduced to values of from 20:1 to 1:1 without the yields and the desired product quality being influenced to a significant extent. Up to a ratio of about 2:1, no decreases in activity have to be accepted. Even above a ratio of 1:1, high activities far above those of conventional systems are achieved.

The catalyst concentration is preferably in the range from $10^{-2}$ to $10^{-6}$ mol/l, more preferably from $10^{-3}$ to $10^{-5}$ mol/l.

The catalyst or cocatalyst loading on $MgCl_2$ is preferably in the range from 0.5 to 5 mmol/g, more preferably from 1 to 3 mmol/g.

Owing to their lower sensitivity to moisture and air and their lower sensitivity to impurities when used in a polymerization, the novel catalyst systems can be handled more safely and give more reproducible results and also a greater, long-term stability in comparison with systems of the prior art.

The entire disclosure of all applications, patents and publications, cited above, and of corresponding German application No. 10010796.6, filed Mar. 8, 2000 is hereby incorporated by reference.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

EXAMPLES a) Preparation of the Novel Catalyst Systems

Application of aluminium alkyl complexes of the formula (I) to $MgCl_2$ as support Basis Organoaluminium compound: $n_{Al\ cocat}[mol]=m_{Al\ cocat}/M_{Al\ cocat}$ $MgCl_2$: $m_{MgCl2}=n_{Al\ cocat}/\text{theor.loading}[mol(Al)/g]-m_{Al\ cocat}$ Hydrocarbon: 50 ml for a total amount of 3–8 g ($m_{MgCl2}+m_{Al\ cocat}$)

Procedure

All work is carried out under protective gas. The hydrocarbon used is dried and distilled prior to the reaction. The organoaluminium compound and the magnesium chloride are placed in a baked-out flask with Schlenk attachment. The appropriate amounts are calculated from the desired theoretical loading, which should be in the range $1$–$2 \times 10^{-3}$ mol (Al)/g. Depending on the solubility of the organoaluminium compound, pentane, hexane, heptane, octane, benzene or toluene is added. The reaction mixture is then stirred at room temperature for 12 hours. The solvent is subsequently removed at 60–120 mbar.

The theoretical loading is calculated according to the following equation:

$$(m_{Al\ cocat}/M_{Al\ cocat})/(m_{Al\ cocat}+m_{MgCl2})=\text{theor.loading[mol(Al)/g]}$$

| Supported component | Loading [mmol/g] |
|---|---|
| 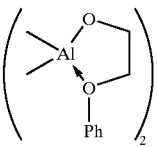 | 1.8 |
| 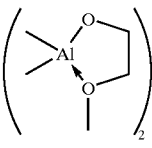 | 1.3 |
| 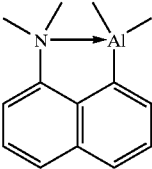 | 1.0 |
| 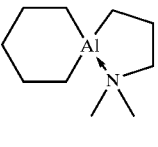 | 1.0 |
| 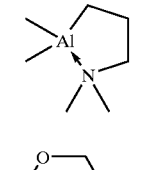 | 1.5 |
| 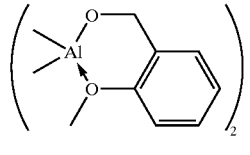 | 1.5 |
| 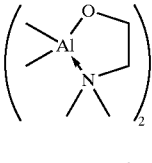 | 1.5 |
| 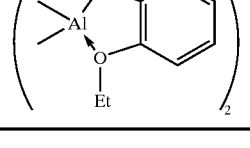 | 1.5 |

Application of (3-dimethylaminopropyl) dimethylaluminium to MgCl$_2$ as support

Basis
Al cocat: 1.77 g (1.2×10$^{-2}$ mol) M$_{Al\ cocat}$=143.21 g/mol

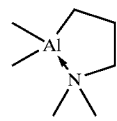

MgCl$_2$: 6.50 g (6.8×10$^{-2}$ mol) M$_{MgCl2}$=95.21 g/mol Pentane: 50 ml
Procedure All work was carried out under protective gas. Pentane was dried and distilled prior to the reaction. The organoaluminium compound and the magnesium chloride were placed in a baked-out 100 ml flask with Schlenk attachment. After addition of 50 ml of pentane, the reaction mixture was stirred at room temperature for 12 hours. The solvent was subsequently removed at 100–120 mbar over a period of 2 hours. This gave a light-grey powder.

The theoretical loading was calculated according to the following equation:

$$(m_{AlN1}/M_{Al\ cocat})/(m_{Al\ cocat}+m_{MgCl2})=1.5\times10^{-3}\ \text{mol/g}$$

Application of TiCl$_4$ to MgCl$_2$ as support
Reaction Conditions and Procedure Suspend MgCl$_2$ in 50 ml of pentane, add TiCl$_4$, stir for 12 hours at 25° C. under an inert gas atmosphere, remove pentane at 80 mbar.

Loading: 1·4 mmol/g.

b) Use of the Novel Catalyst Systems in the Polymerization of Olefins

The polymerization is carried out in a known manner in solution, suspension or the gas phase, continuously or batchwise, at a temperature of from 0° C. to +200° C., preferably from +20 to +140° C., and a pressure of from 1 to 20 bar, preferably from 2 to 10 bar. Hexane, heptane, octane, propene or toluene is used as solvent.

Olefins which are polymerized have the formula R$^a$—CH=CH—R$^b$, where R$^a$ and R$^b$ are identical or different and are each hydrogen or an alkyl radical having from 1 to 20 carbon atoms, preferably ethylene, H$_2$C=CH$_2$, and propylene, MeHC=CH$_2$.

The novel catalyst systems make it possible to prepare homopolymers, copolymers and block copolymers, preferably the homopolymers polyethylene and polypropylene.

The activities of the catalyst systems in the polymerization of ethylene and propylene are comparable to or better than those of MgCl$_2$, TiCl$_4$ and AlEt$_3$, but using a distinctly lower cocatalyst/catalyst ratio.

All the novel catalyst systems gave high molecular weight and finely particulate polymers.

The molecular weights of the polyethylene samples are in the range 2·10$^6$–8·10$^6$ g/mol. The melting points vary from 135° C. to 140° C. The crystallinities are in the range from 40 to 80%. The polymer samples are unbranched and linear.

The polypropylene samples have molecular weights of 4·10$^5$–1•10$^6$ g/mol and a molecular weight distribution of 7–15, which is distinctly lower than that obtained using AlEt$_3$. The melting points vary from 150° C. to 160° C. The crystallinities are in the range from 30 to 60%.

The catalyst systems are, without addition of donors, stereoselective in propylene polymerization. $^{13}$C-NMR analyses of the polypropylene samples show linear structures with isotactic sequence lengths having significantly higher frequencies of mmmm pentads compared to those obtained using $AlEt_3$.

Polymerization of Ethylene and Propylene

All polymerizations were carried out under an argon gas atmosphere using Schlenk techniques. Solid catalyst and cocatalyst components were weighed out on an analytical balance in a BRAUN. Labmaster 130 glove box. For a standard experiment, the substances were introduced into a 25 ml glass flask in such amounts that about $0.5 \cdot 10^{-3}$ mol of supported aluminium atoms could be used for the polymerization. The titanium tetrachloride used as catalyst was employed in the form of a 0.1 mol/l stock solution in toluene. For experiments using supported titanium tetrachloride, a 0.1 mol/l suspension of the supported catalyst was prepared. The unsupported cocatalyst was weighed into a 25 ml glass flask in such an amount that about $0.5 \cdot 10^{-3}$ mol of aluminium atoms could be used for the polymerization.

The polymerizations were carried out in a 1 l glass autoclave from Büchi. Before each experiment, the reactor was cleaned using ethanol and toluene, hexane or heptane, evacuated at 95° C. by means of an oil pump vacuum for one hour and during this time flushed a number of times with argon. The autoclave was charged successively with 195 ml of toluene, hexane or heptane and the supported cocatalyst suspended in 4 ml of toluene, hexane or heptane. The temperature was adjusted to 30, 45 or 60° C. The monomer was injected under a pressure of 2 or 10 bar. After the suspension present in the reactor had been saturated with the monomer, the polymerizations were started by injection of 1 ml of a 0.1 mol/l solution of titanium tetrachloride in toluene. In the case of experiments using unsupported aluminium alkyls and supported titanium tetrachloride, the catalyst suspension was added first and the polymerizations were then started by injection of a toluene, hexane or heptane solution of the cocatalyst. The isobaric reaction conditions were maintained by the monomer supply of the reactor consisting of a BROOKS pressure regulator PC8606 and a BROOKS mass flow controller 5850TR. The monomer consumption was recorded by means of a BROOKS control and display instrument model 5876 and a connected personal computer fitted with an A/D converter board, using the RTX View software.

The polymerizations were stopped by injection of 5 ml of ethanol. The polymerization suspension was admixed with dilute hydrochloric acid and stirred overnight. The organic phase was neutralized using a saturated sodium hydrogen carbonate solution and washed with water. The toluene was removed in an oil pump vacuum until the mass of the polymer was constant.

Polymer Analysis

The thermograms were recorded on a Mettler-Toledo differential calorimeter 821e at a heating rate of 20° C./min. The values obtained in the second heating have been reported as the melting points.

The viscosity means of the molar masses $M_\eta$ were determined by means of an Ubbelohde viscometer. The samples were prepared by dissolving about 50 mg of the polymer in 50 ml of decahydronaphthalene. The times for the polymer solutions to run out were measured by means of a LAUDA Viskoboy. The Mark-Houwink constants were taken from T. G. Scholte, N. L. J. Meijerink, H. M. Schoeffeleers, A. M. G. Brands, *J. Appl. Polym. Sci.* 29 (1984) 3763.

The $^{13}$C-NMR spectra were recorded using a BRUKER-MSL 300 instrument. For one measurement, usually 1000 scans were recorded at a measurement frequency of 75.47 MHz and a temperature of 100° C. The pulse angle was 60° and the relaxation delay was 6 s. The NMR samples were prepared by making up a solution of 10% by mass of polymer in a mixture of perchlorobutadiene and 1,1,2,2-tetrachlorodideuteroethane.

Polymerization of Ethylene Using Aluminium Alkyl Compounds and $TiCl_4$ Supported on $MgCl_2$ Polymerization conditions: $T_p=30°$ C., $p_{monomer}=2$ bar, $c_{Ti}=10^{-5}$ mol/l, Al/Ti=5

| Cocatalyst | Activity [$kg_{PE}$/($mol_{Ti}$ $c_{ethene}$h)] | $T_m$ [° C.] | Crystallinity [%] | η [ml/g] | $M_\eta \cdot 10^6$ [g/mol] |
|---|---|---|---|---|---|
| (bis[Al-O-CH₂-CH₂-O with Ph on Al])₂ | 90 | 136.8 | 39.7 | n.d. | n.d. |
| Al-pyrrolidine (N,N-dialkyl) | 100 | 135.5 | 59.3 | 2050 | 3.10 |
| Al-piperidine type | 480 | 131.2 | 54.0 | 1795 | 5.11 |
| (Al with O and N ring)₂ | 27 | n.d. | n.d. | n.d. | n.d. |
| $Et_2Al$–O–Et cyclic | 700 | 132.5 | 53.3 | n.d. | n.d. |
| $(i\text{-}Bu)_2Al$–O–Et cyclic | 8 | 132.9 | 38.0 | n.d. | n.d. |
| $AlMe_2$–O–(cyclic)–O | 320 | 132.3 | 53.5 | n.d. | n.d. |
| $AlEt_3$ for comparison | 670 | 138.9 | 51.0 | 2254 | 3.53 | n.d. = not determined

Polymerization of Propylene Using Aluminium Alkyl Compounds and $TiCl_4$ Supported on $MgCl_2$ Polymerization conditions: $T_p=30°$ C., $p_{monomer}=2$ bar, $c_{Ti}=10^{-5}$ mol/l, Al/Ti=5

| Co-catalyst | Activity [kg_PE/(mol_Ti · c_propene · h)] | $T_m$ [°C.] | Crystallinity [%] | $\eta$ [ml/g] | $M_\eta \cdot 10^6$ [g/mol] |
|---|---|---|---|---|---|
| (Me₂Al(O-CH₂-CH₂-O-Ph))₂ | 2 | 151.6 | 10.4 | n.d. | n.d. |
| Me₂Al←N(pyrrolidine) | 8 | 152.8 | 23.8 | 333 | 0.704 |
| (cyclohexyl)Al←N(pyrrolidine) | 3 | 145.8 | 15.2 | 393 | 0.886 |
| (Me₂Al(O-CH₂-CH₂-O-Me))₂ | 12 | n.d. | n.d. | n.d. | n.d. |
| (Me₂Al(O-CH₂-C₆H₄-O-Me))₂ | 8 | n.d. | n.d. | n.d. | n.d. |
| AlEt₃ | 62 | 152.2 | 11.5 | 217 | 0.388 | n.d. = not determined

The microstructure of the polypropenes obtained using MgCl₂/aluminium alkyl compounds and TiCl₄:

Polymerization conditions: $T_p=30°$ C., $p_{monomer}=2$ bar, $c_{Ti}=10^{-5}$ mol/l, Al/Ti=5

| | $n_{iso}$ | Rel. Int. [%] | Pentads | | | | | | | | |
|---|---|---|---|---|---|---|---|---|---|---|---|
| | | | Mmmm | Mmmr | Rmmr | mmrr | rmrr + mrmm | mrmr | rrr | rrrm | Mrrm |
| Me₂Al←N(pyrrolidine) | 10 | Rel. Int. [%] | 57.9 | 9.1 | 1.4 | 0.0 | 9.7 | 6.0 | 2.7 | 8.0 | 5.3 |
| (cyclohexyl)Al←N(pyrrolidine) | 5 | Rel. Int. [%] | 38.3 | 8.9 | 2.6 | 0.0 | 13.6 | 9.1 | 2.4 | 13.3 | 11.8 |
| AlEt₃ for comparison | 7 | Rel. Int. [%] | 46.5 | 10.9 | 2.9 | 0.0 | 12.8 | 8.7 | 2.9 | 8.7 | 6.5 |

Polymerization of Ethylene Using MgCl₂/TiCl₄ and Aluminium Alkyl Compounds

| Co-catalyst | Activity [$kg_{PE}/(mol_{Ti} \cdot c_{ethene} h)$] | $T_m$ [°C.] | Crystallinity [%] | $\eta$ [ml/g] | $M_\eta \cdot 10^6$ [g/mol] |
|---|---|---|---|---|---|
| 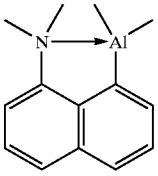 | 309 | 137.7 | 50.4 | 2020 | 3.03 |
|  | 480 | 136.4 | 46.9 | 2120 | 3.24 |
| 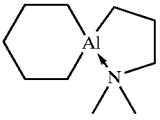 | 315 | 135.1 | 42.3 | 2210 | 3.43 |
| 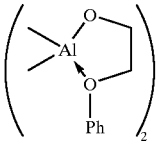 | 105 | 137.4 | 42.6 | n.d. | n.d. |
| 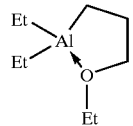 | 700 | n.d. | n.d. | n.d. | n.d. |
| 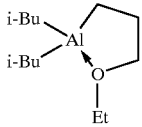 | 15 | n.d. | n.d. | n.d. | n.d. |
| 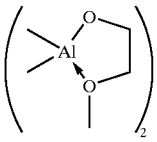 | 23 | n.d. | n.d. | n.d. | n.d. |
| 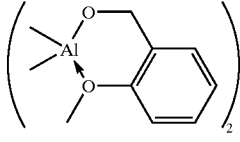 | 30 | n.d. | n.d. | n.d. | n.d. |
| 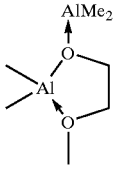 | 1100 | n.d. | n.d. | n.d. | n.d. |
| $AlEt_3$ for comparison | 600 | 139.1 | 53.0 | 1801 | 2.59 |
n.d. = not determined Polymerization of Propylene Using $MgCl_2/TiCl_4$ and Aluminium Alkyl Compounds Polymerization conditions: $T_p=30°$ C., $p_{monomer}=2$ bar, $c_{Ti}=10^{-5}$ mol/l, Al/Ti=5

| Co-catalyst | Activity [$kg_{PE}$/($mol_{Ti}$ $c_{propene}$h)] | $T_m$ [°C.] | $\eta$ [ml/g] | $M_\eta \cdot 10^6$ [g/mol] |
|---|---|---|---|---|
| 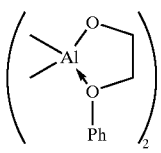 | 17 | 150.9 | 11.1 | n.d. |
| 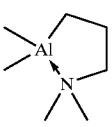 | 145 | 154.4 | 309 | 0.634 |
| 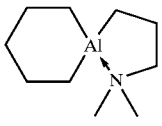 | 95 | 148.5 | 346 | 0.740 |
| 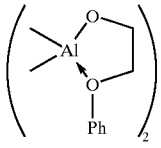 | 2 | n.d. | n.d. | n.d. |
| 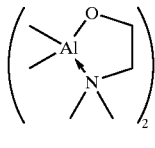 | 2 | n.d. | n.d. | n.d. |
| $AlEt_3$ for comparison | 155 | 151.0 | 186 | 0.312 | n.d. = not determined

The molecular weights and molecular weight distributions of the polypropenes obtained using $MgCl_2/TiCl_4$ and aluminium alkyl compounds:

| Cocatalyst | $M_n$ [g/mol] | $M_w$ [g/mol] | $M_w/M_n$ |
|---|---|---|---|
| 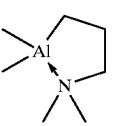 | 55000 | 738000 | 13.4 |
| 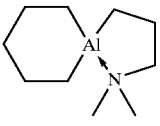 | 60400 | 962000 | 15.9 |
| $AlEt_3$ for comparison | 15500 | 441000 | 28.4 |

The microstructure of the polypropenes obtained using $MgCl_2/TiCl_4$ and aluminium alkyl compounds:

| | $n_{iso}$ | Rel. Int. [%] | Pentads | | | | | | | | |
|---|---|---|---|---|---|---|---|---|---|---|---|
| | | | Mmmm | Mmmr | rmmr | mmrr | rmrr + mrmm | mrmr | rrr | rrrm | mrrm |
| 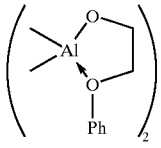 | 8 | Rel. Int. [%] | 54.3 | 11.7 | 4.7 | 11.3 | 6.4 | 2.9 | 2.5 | 3.8 | 2.4 |
| 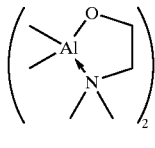 | 5 | Rel. Int. [%] | 36.9 | 10.2 | 2.5 | 13.8 | 8.8 | 1.8 | 14.3 | 7.0 | 4.8 |
| $AlEt_3$ for comparison | 7 | Rel. Int. [%] | 51.0 | 8.1 | 2.0 | 10.3 | 6.9 | 1.7 | 11.5 | 5.0 | 3.4 |

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A catalyst system comprising
   a) as a cocatalyst, at least one aluminum alkyl complex of the formula (I)

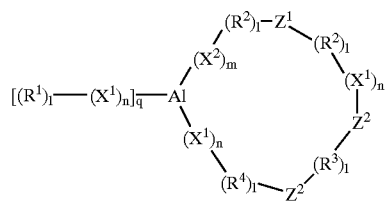

I where
$X^1$ is NH, $NH_2$*, NH—A*, NH—$SiA_3$*, N—A, $NSiA_3$, $N(A)_2$*, $N(SiA_3)_2$*, O, $OSiA_2$, OA*, $OSiA_3$*, OAryl*, S, $SSiA_2$, SA*, $SSiA_3$*, PA, $PSiA_3$*, $P(A)_2$*, $P(SiA_3)_2$* or a single bond,
$X^2$ is NH, N—A, $NSiA_3$, O, $OSiA_2$, S, $SSiA_2$, PA or $X^1$ coordinated to $Al(R^1)_3$, or a single bond,
$R^1$ is H; Hal when n=0; A, optionally covalently bound to Al; $Si(A)_3$ when $X^1$=O,
$R^2$ is A, optionally covalently bound to Al; $CH_2$—CH=CH, $CH_2$—C≡C when $Z^1$=H;

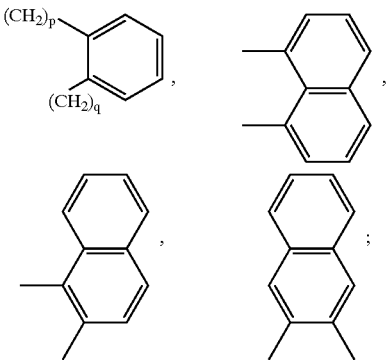

$R^3$ and $R^4$ are each, independently of one another, a bond or $R^2$ or $Si(A)_3$ or $Si(A)_2$,
$Z^1$ is a bond or H bound to $R^2$,
$Z^2$ is a bond or H bound to $R^3$ and $R^4$, where
   A is branched or unbranched $C_1$–$C_7$-alkyl, -alkylidene or -alkenylidene,
   Aryl is phenyl, naphthyl, indenyl, fluorenyl,
   Hal is F, Cl,
   and, independently of one another,
   n is 0 or 1,
   m is 0 or 1,
   p is 0 or 1,
   q is 1 or 2,
   l is 0 or 1,
   where coordinate bonds can exist between $X^1$, $X^2$ and Al, and $R^1$, $R^2$, $R^3$, $R^4$, $X^1$, $X^2$, $Z^1$ and $Z^2$ can in each case independently of one another at different positions in the molecule, assume all meanings and $X^1$ can assume only the meanings denoted by "*" when 1–0 and $R^1$, $R^2$, $R^3$ or $r^4$ are not present,
   b) magnesium chloride, $SiO_2$ or $SiO_2$ in combination with $MgCl_2$ as support material for the cocatalyst and transition metal compound,
   c) at least one transition metal compound selected from the group consisting of titanium halides and vanadium halides; and
   d) at least one internal donor selected from the group consisting of monoesters and diesters and optionally, one or more external donors selected from the group consisting of compounds $RSi(OR)_3$ and $R_2Si(OR)_2$, where R are each, independently of one another, a branched or unbranched $C_1$–$C_{10}$-alkyl group.

2. A catalyst system according to claim 1, comprising at least one aluminum alkyl complex of the formula (I) selected from the group consisting of:

[3-(dimethylamino)propyl]dimethylaluminum,
[3-(dimethylamino)propyl]methylaluminum chloride,
[3-(diethylamino)propyl]diethylaluminum,
[3-(diethylamino)propyl]dipropylaluminum,
[3-(diethylamino)propyl]dibutylaluminum,
[4-(diethylamino)butyl]dibutylaluminum,
[3-dimethylamino)propyl]aluminum dichloride,
[2-(dimethylamino)benzyl]diethylaluminum,
[3-(dimethylamino)benzyl]ethylaluminium chloride,
[2,6-bis(dimethylaminomethyl)phenyl]diethylaluminum,
[8-(dimethylamino)naphthyl]dimethylaluminum,
[8-(dimethylamino)naphthyl]diethylaluminum,
1-[3-(dimethylamino)propyl]-1-aluminacyclohexane,
1-[3-(dimethylamino)-2-methylpropyl]-1-aluminacyclohexane,
1-[3-(dimethylamino)propyl]-1-aluminacycloheptane,
bis[3-(dimethylamino)propyl]methylaluminum,
1,5-dimethyl-1alumina-5-azacyclooctane,
1-ethyl-5-methyl-1-alumina-5-azacyclooctane,
1-alumina-5-azabicyclo[3.3.3]undecane,
[4-(methoxy)butyl]dimethylaluminum,
[3-(ethoxy)propyl]diethyaluminum,
[3-(ethoxy)propyl]dibutylaluminum,
[3-(propoxy)propyl]dibutylaluminum,
[4-(ethoxy)butyl]dibutylaluminum,
[5-(ethoxy)pentyl]dibutylaluminum,
[3-(ethylthiopropyl)diethylaluminum,
[3-(ethylthiopropyl)dibutylaluminum,
bis([2-dimethylamino)ethoxy]dimethylaluminum)
bis([2-dimethylamino)ethoxy]diethylaluminum)
bis([2-diethylamino)ethoxy]diethylaluminum)
bis([3-diethylamino)propoxy]diethylaluminum)
bis([2-dimethylamino)ethoxy]dibutylaluminum)
bis([2-methoxy)ethoxy]dimethylaluminum)
bis([3-methoxy)propoxy]dimethylaluminum)
bis([2-methoxy)ethoxy]diethylaluminum)
bis([2-(methoxy)ethoxy]dibutyllaluminum)
bis([2-(butoxy)ethoxy]dimethylaluminum)
bis([2-(butoxy)ethoxy]dibutylaluminum)
bis([2-(ethoxy)ethoxy]diethylaluminum)
bis([2-(phenoxy)ethoxy]dimethylaluminum)
bis([2-(methoxy)phenoxy]dimethylaluminum)
[2-(diethylamino)ethoxy]diethylaluminum.$AlEt_3$ adduct,
[3-(diethylamino)propoxy]diethylaluminum.$AlEt_3$ adduct,
[2-(methoxy)ethoxy]dimethylaluminum.$AlMe_3$ adduct,
[2-(methoxy)ethoxy]diethylaluminum.$AlEt_3$ adduct,
[2-(ethoxy)ethoxy]diethylaluminum.$AlEt_3$ adduct,
[3-(ethoxy)propoxy]diethylaluminum.$AlEt_3$ adduct, and
[2-(methylthio)ethoxy]dimethylaluminum.$AlMe_3$ adduct.

3. A catalyst system according to claim 1, wherein the cocatalyst/catalyst ratio is in the range from 80:1 to 1:1.

4. A catalyst system according to claim 1, wherein the cocatalyst/catalyst ratio is in the range from 20:1 to 5:1.

5. A process for preparing a catalyst system for the polymerization of α-olefins or prochiral olefins, comprising
   (a) applying a titanium or vanadium halide to $MgCl_2$, $SiO_2$ or $SiO_2$ in combination with $MgCl_2$ as support and adding an aluminum compound of the formula (I) as described in claim 1, or
   (b) applying an aluminum compound of the formula (I) as described in claim 1 to $MgCl_2$, $SiO_2$, or $SiO_2$ in combination with $MgCl_2$ as support and adding a titanium or vanadium halide or
   (c) applying an active species generated from an aluminum compound of the formula (I) and a titanium or vanadium halide to $MgCl_2$, $SiO_2$ or $SiO_2$ in combination with $MgCl_2$.

6. A method comprising heterogeneous polymerization of at least one α-olefin in the presence of a catalyst system of claim 1.

7. The method of claim 6 wherein the at least one α-olefin includes ethylene or propylene.

8. A method comprising polymerizing at least one prochiral olefin in the presence of a catalyst system of claim 1.

9. The method comprising polymerizing at least one olefin in the presence of a catalyst system according to claim 1 as a stereoselectivity promoter.

* * * * *